(12) United States Patent
Whitnall et al.

(10) Patent No.: US 7,108,140 B2
(45) Date of Patent: Sep. 19, 2006

(54) ARTICLE SUPPORT RACK FOR VEHICLE

(76) Inventors: Frederick William James Whitnall, 29 Russell Street, Balgowrie, NSW 2519 (AU); Laura Jane Whitnall, 29 Russell Street, Balgowrie, NSW 2519 (AU)

( * ) Notice: Subject to any disclaimer, the term of this patent is extended or adjusted under 35 U.S.C. 154(b) by 0 days.

(21) Appl. No.: 11/138,114

(22) Filed: May 26, 2005

(65) Prior Publication Data

US 2005/0230331 A1    Oct. 20, 2005

Related U.S. Application Data

(63) Continuation of application No. PCT/AU03/01571, filed on Nov. 26, 2003.

(30) Foreign Application Priority Data

Nov. 27, 2002  (AU)  ............................. 2002952948

(51) Int. Cl.
*A47F 7/00* (2006.01)
(52) U.S. Cl. ........................................ 211/22; 211/195
(58) Field of Classification Search .................. 211/22, 211/21, 17, 18, 19, 20, 195, 201; 248/150; 224/42.12, 502, 42.13, 497, 495, 519, 521, 224/924; 414/462, 466
See application file for complete search history.

(56) References Cited

U.S. PATENT DOCUMENTS

| | | | | |
|---|---|---|---|---|
| 574,628 A | * | 1/1897 | Phillips | ........................ 211/22 |
| 581,585 A | * | 4/1897 | Hirschman et al. | ........... 211/21 |
| 646,053 A | * | 3/1900 | Humphrey | .................... 211/21 |
| 3,675,784 A | * | 7/1972 | John | ............................ 211/22 |
| 5,209,628 A | | 5/1993 | Hassell | |
| 6,164,896 A | | 12/2000 | Cummins | |
| 6,302,278 B1 | * | 10/2001 | Dueck | ......................... 211/17 |
| 6,345,693 B1 | * | 2/2002 | Yeo et al. | .................... 187/211 |
| 6,460,743 B1 | * | 10/2002 | Edgerly et al. | ............. 224/324 |
| 6,655,562 B1 | * | 12/2003 | Jeong | ......................... 224/282 |
| 6,691,878 B1 | * | 2/2004 | Ouitz | ......................... 211/104 |
| 6,736,301 B1 | * | 5/2004 | Huang | ........................ 224/500 |
| 6,755,599 B1 | * | 6/2004 | Plyler | .......................... 410/30 |

FOREIGN PATENT DOCUMENTS

| | | |
|---|---|---|
| DE | 19621409 | 2/1997 |
| DE | 19624017 | 12/1997 |
| DE | 20002018 | 5/2000 |

* cited by examiner

*Primary Examiner*—Jennifer E. Novosad
(74) *Attorney, Agent, or Firm*—Brooks Kushman P.C.

(57) ABSTRACT

A transportable article support rack is disclosed. The transportable article support rack includes a hitch connector for releasable connecting the rack to a vehicle. The rack also includes a main column assembly pivotally mounted to the hitch connector, a support assembly for supporting an article, and a locking assembly adapted to lock the main column assembly in a transport position. The locking assembly includes at least first and second articulated locking arms, the articulated locking arms pivotally connected to one another. The second locking arm, when locked, forms a truss between the main column assembly and the support assembly for increased article support strength when in the transport position.

18 Claims, 3 Drawing Sheets

ARTICLE SUPPORT RACK FOR VEHICLE

CROSS-REFERENCE TO RELATED APPLICATIONS

This application is a continuation of and claims priority to PCT application No. PCT/AU2003/001571, filed Nov. 26, 2003.

FIELD OF THE INVENTION

This invention relates generally to article support racks which mount to vehicles.

One particular application of this invention concerns article support racks attachable to the rear of passenger vehicles, for example by connecting to a towbar or hitch. Although it will be convenient to hereinafter refer to this application, it is to be understood that this is not to be taken as a limitation of the scope of the invention.

BACKGROUND TO THE INVENTION

Articulated support racks are known, however, when subjected to high wind and other varying loads, this style of rack tends to lack strength, as a result of its jointed structure, dictated by the need to be raised and lowered into transport and loading positions respectively. Locking the support rack in the transport position has also not been addressed adequately, in a way that also complements the strength requirements.

The present invention seeks to alleviate one or more of the abovementioned disadvantages.

SUMMARY OF THE INVENTION

According to one aspect of the present invention there is provided a support rack suitable for releasable connection to a vehicle, the support rack movable between a transport position and a loading position, the support rack including: a main prop assembly adapted to be operatively connected to the vehicle when the support rack is in use; a support assembly for supporting the article, the support assembly pivotally connected to the main prop assembly; and a locking assembly adapted to lock the support rack in the transport position, the locking assembly including a plurality of articulated locking arms.

Preferably, the main frame is in the form of a column assembly pivotally connected at its base to a mounting bracket, and at its top to the support frame. In one form, the column assembly includes two post assemblies longitudinally spaced apart and pivotally connected to the mounting bracket. Both post assemblies may be pivotally connected to the support frame such that when the rack is moved from the transport position to the loading position, the support frame is maintained in a generally horizontal position. While the post assembly in the transport position defines a rectangle, in the loading position, the post assembly defines a parallelogram.

In one form, the support frame may be one or more U-shaped tubes, or alternately-shaped bodies for the purpose of broadening the support base for articles and maintaining low overall mass of the rack.

Preferably the locking assembly includes articulated locking arms and a securing device for fastening one or more arms to the column assembly. A first locking arm is pivotally connected at its lower end to the column assembly, and a second locking arm is pivotally connected at its upper end to the support frame. The securing device fastens the second arm and the column assembly together.

The longitudinally-spaced apart post assemblies may be arranged into pairs of laterally spaced apart posts, with each pair tied so as to articulate in unison, the tying being by any suitable means such as for example bolts or rods. The bolts or rods may also pivotally connect the locking bars.

In one preferred form the securing device fastens the second locking arm to its respective post. Preferably, the securing device is in the form of holes in both locking arm and post with a lock pin passing therethrough and having a keeper clip or split pin to maintain the lock pin in place. However, threaded holes with threaded bolts or screws may be used; or a clamping device, or other suitable means.

The upper end of the second locking arm is preferably pivotally connected to the support frame distal the pivotal connection between the column assembly and support frame, and generally intermediate the pivotal connection and the rearward end of the support frame. This spacing allows the locking arm to provide strengthening to the rack, as the arm forms a truss structure with the post and support beam when the securing device has fastened the locking arm to the column assembly.

Preferably, biasing means are provided to dispose the articulated rack to return to the raised position. The biasing means may be in the form of, for example, springs, elasticised cords, octopus straps and the like.

Stops may also be provided, in one position so as to prevent the biasing means from driving the posts into the rear of a vehicle to which the rack may be attached. In another position the stops define the rack's lowered position, and prevent the support rack from descending below a predetermined height for article loading.

A handle may also be provided, to assist in raising and lowering the rack. In one form the handle forms part of the second locking arm, and is an extension thereof.

The mounting bracket is adapted to attach to both gooseneck/towball and hitch-style towing structures, via a hollow tube with a receiving section for receiving a towball and a clamp. The hollow tube fits within or without the hitch-style (also known as Hayman-Reece) towing structure, and is secured in the known manner, while the towball inserts into the hole and the clamp secures the mounting bracket to the towing structure. The clamp may be threaded bolts to attach to the towing structure.

The support frame may include clamps for holding, for example, bicycle frames and the like.

DESCRIPTION OF A PREFERRED EMBODIMENT

In order to enable a clearer understanding of the invention, drawings illustrating example embodiments are attached, and in those drawings.

Figure 3:
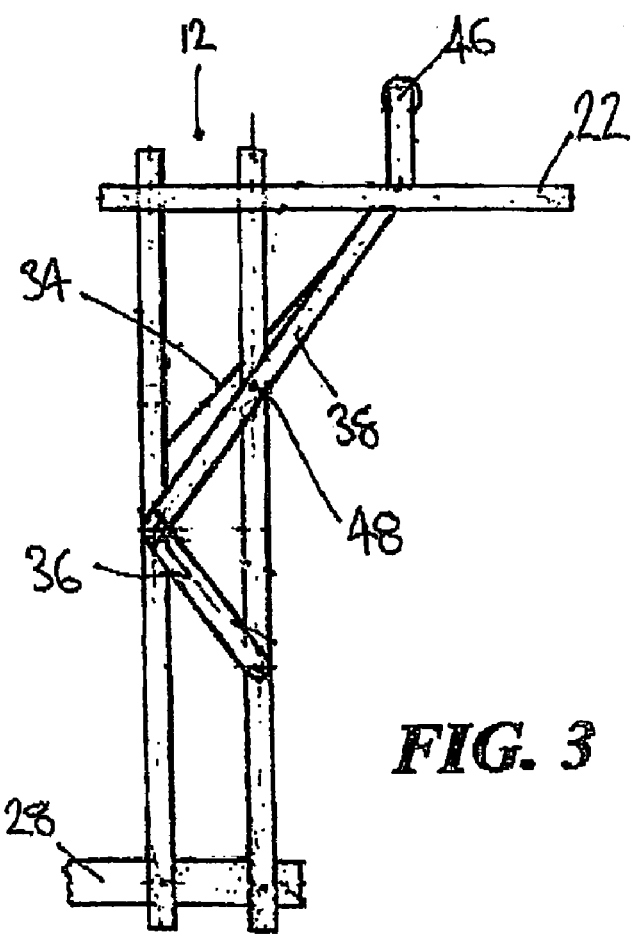
FIG. 3 is a side elevation view of the rack in the transport position.
Figure 4:
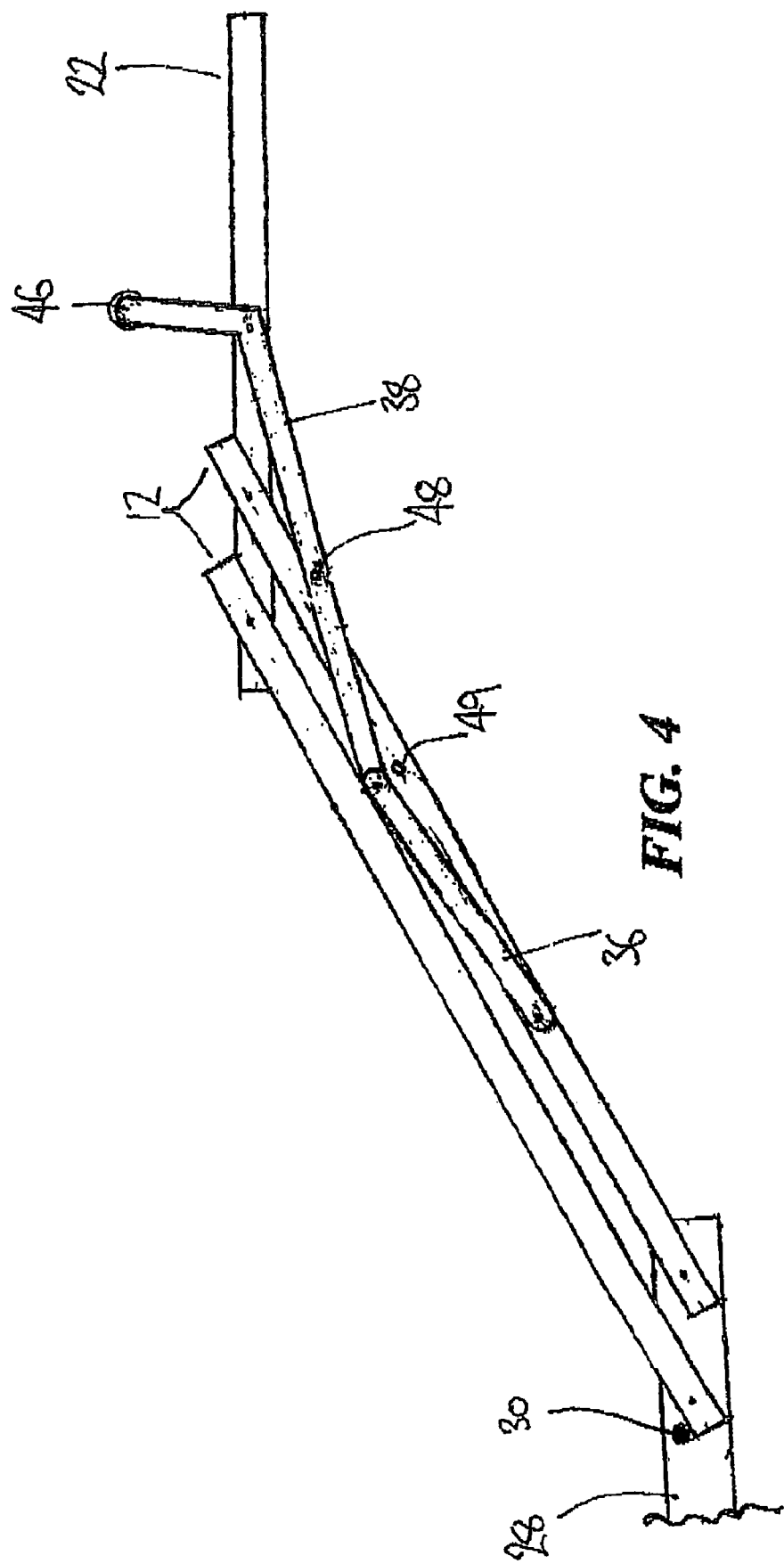
FIG. 4 is a side elevation view of the rack in the loading position.

Referring to the drawings there is shown an article support rack including column assembly 12 which includes post assembly including posts 14, 16, 18 and 20, pivotally connected at each respective lower end to mounting bracket 28 and at its upper ends to a support frame 22, for movement between a transport position (FIGS. 1–3) and a loading position (FIG. 4).

The support frame 22 includes U-shaped support arms 24 and 26, each of which is pivotally connected to their respective posts (eg tube 24 to posts 14 and 16) such that under movement between the transport and loading positions, the support frame maintains a horizontal orientation. Thus, in the transport position the column assembly 12 defines a rectangle, while in the loading position the column assembly 12 defines a parallelogram.

Figure 1:
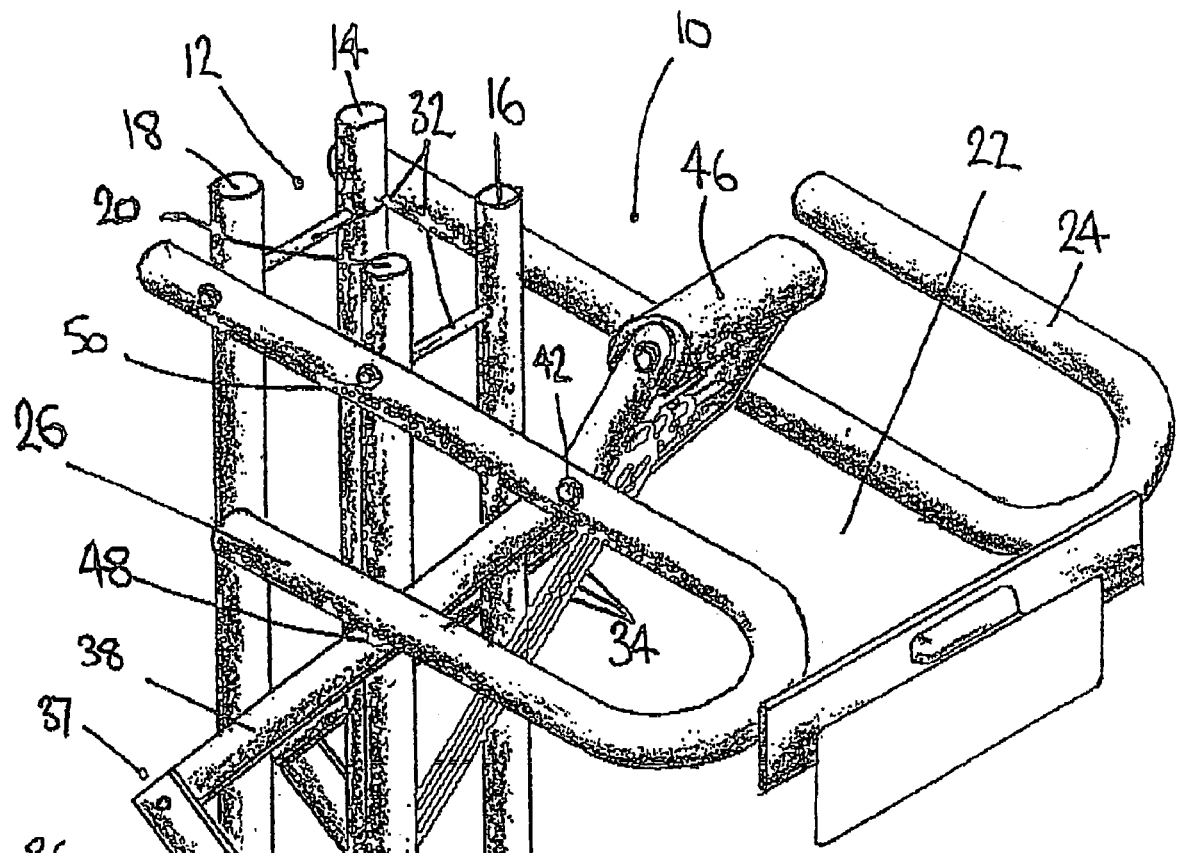
FIG. 1 is an isometric view of the rack in the transport position.
Figure 2:
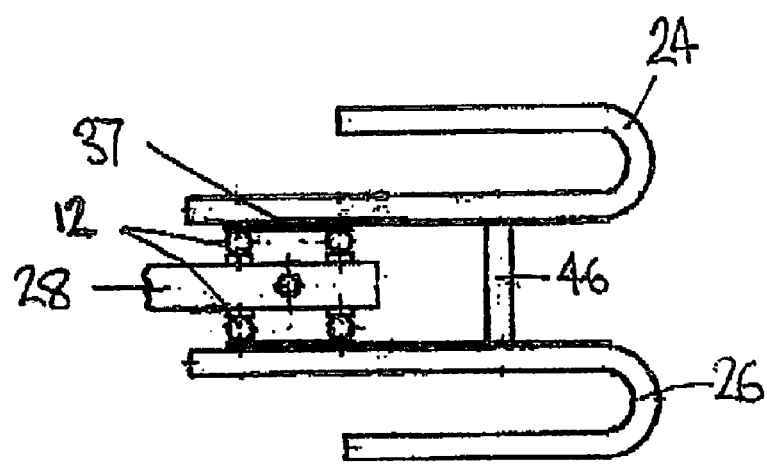
FIG. 2 is a plan view of the rack in the transport position.

A locking assembly 37 is provided, including a first locking arm 36 and a second locking arm 38, the second locking arm 38 in FIGS. 1–3 being secured to its respective post 20 through hole 48 (which passes through both post 20 and arm 38) via lock pin (not shown). The second arm 38 is pivotally connected to support arm 26 at 42, distal the pivotal connection 50, so that when locked in the transport position, the locking assembly 37 provides additional strength to the support rack 10 via truss structure formed by links 48–50 (post 20), 50–42 (support arm) and 42–48 (second locking bar 38). Locking assembly 37, including lock pin and through holes corresponds with another locking assembly (not numbered) on the opposite side of the rack 10.

A handle is provided at 46, in the form of an extension of second locking arm 38, to assist in moving between loading and transport positions, and vice versa. The handle extends from the second locking arm at an angle and, due to this angle and the articulation of the second locking arm 38, the handle tends to adopt a comfortable lifting position to lift or lower the frame between transport and loading positions.

Biasing means in the form of elasticised cords 34 are provided, anchored between the forward post assembly (posts 14 and 18) and support frame ties (pivotal connection at 42). These cords arrest any acceleration from transport position and loading position, and also assist in moving from loading position to transport position.

Stops are provided at 30, in the form of bars operatively connected to mounting bracket 28 to define the final position of the column assembly takes in the loading and transport positions, by obstructing movement of respective posts.

The mounting bracket 28 fits at least two styles of towing structures, the towball/gooseneck, and the hitch (also known as Hayman/Reece style), via a hollow section with a receiving section for receiving a towball and a clamp. The hollow tube fits within or without the hitch-style (also known as Hayman-Reece) towing structure, and is secured in the known manner, while the towball inserts into the hole and the clamp secures the mounting bracket to the towing structure. The clamp may include threaded bolts to attach to the towing structure.

In operation a user may move the support rack 10 from the transport position shown in FIGS. 1–3 by removing the pin in hole 48 and taking hold of the handle 46 and moving outwards and downwards towards the loading position shown in FIG. 4, until the posts rest against the stops 30. The rectangle formed in the loading position by the column assembly 12 becomes a parallelogram, the locking assembly 37 becomes elongated, and the handle 46 stands more erect, for convenient access. Articles, such as for example, bicycles, may be then loaded onto the support frame 22, and clamped into position via clamps (not shown). The handle 46 may then be grasped, the support frame and articles placed into the transport position shown in FIGS. 1–3, and the lock pin inserted through both locking arm 38 and post 20 via hole 48 and a keeper clip inserted into lock pin (both not shown) to increase rigidity and maintain the rack 10 in the transport position. Similar pins and keeper clips should be inserted into corresponding holes in the other side of the apparatus.

Finally, it is to be understood that various alterations, modifications and/or additions may be incorporated into the various constructions and arrangements of parts without departing from the spirit or ambit of the invention.

The invention claimed is:

1. A transportable article support rack moveable between a transport position and a loading position, the transportable article support rack including: a hitch connector for' releasable vehicle connection; a main column assembly pivotally mounted at a base end to the hitch connector; a support assembly for supporting an article, the support assembly pivotally connected to the main column assembly; and a locking assembly operatively connected to the main column assembly, the locking assembly adapted to lock the main column assembly in the transport position, the locking assembly including at least first and second articulated locking arms, wherein the first locking arm is pivotally connected to the second locking arm, the latter of which when locked, forms a truss between the main column assembly and the support assembly for increased article support strength when in the transport position.

2. A transportable article support rack in accordance with claim 1 wherein the truss extends between a distal portion of the support assembly and an intermediate portion of the main column assembly.

3. A transportable article support rack in accordance with claim 1 wherein a mounting bracket is provided for pivotally mounting the main column assembly the mounting bracket connected to the hitch connector.

4. A transportable article support rack in accordance with claim 3 wherein the main column assembly includes two post assemblies each having pivoting mountings longitudinal spaced apart from one another on the mounting bracket.

5. A transportable article support rack in accordance with claim 4 wherein the two post assemblies are pivotally connected to the support assembly such that when the article support rack is moved from the transport position to the loading position, the support assembly is maintained in a generally horizontal position.

6. A transportable article support rack in accordance with claim 4 wherein each post assembly includes a pair of posts for additional strength in transporting the articles.

7. A transportable article support rack in accordance with claim 6 wherein two pairs of articulated locking arms are provided, each respective pair operatively connected to one of each pair of posts in each post assembly.

8. A transportable article support rack in accordance with claim 1 wherein the support assembly includes a platform constructed from one or more tubes formed into U-shapes so as to provide a broad support base for articles.

9. A transportable article support rack in accordance with claim 1 wherein biasing means are provided to bias the support assembly towards the transport position, the biasing means being connected between the main column assembly and the support assembly.

10. A transportable article support rack in accordance with claim 9 wherein the biasing means includes springs or elasticized cords.

11. A transportable article support rack in accordance with claim 1 wherein first and second stops are provided, on the hitch connector, the first stop to inhibit the main column assembly from abutting the vehicle and the second stop to inhibit the support rack from descending below a selected height in the loading position.

12. A transportable article support rack in accordance with claim 1 wherein a handle is provided, operatively connected to the support assembly, to assist in raising and lowering the support assembly.

13. A transportable article support rack in accordance with claim 12 wherein the handle is an extension of the second locking arm.

14. A transportable article support rack in accordance with claim 13 wherein the handle extends from the second locking arm at an angle.

15. A transportable article support rack in accordance with claim 1 wherein a pin is provided which when locking the support assembly in the transport position, extends through aligned holes in the second locking arm and a main column assembly.

16. A transportable article support rack in accordance with claim 1 wherein the hitch connector is a clamp and hollow tube having a receiving section for receiving a towball so that the hitch connector is attachable to both towball and hitch-style towing structures.

17. A transportable article support rack in accordance with claim 16 wherein the clamp includes threaded bolts to attach to a hitch.

18. A transportable article support rack in accordance with claim 1 wherein the support assembly includes clamps for holding bicycles.

* * * * *

UNITED STATES PATENT AND TRADEMARK OFFICE
CERTIFICATE OF CORRECTION

| | | |
|---|---|---|
| PATENT NO. | : 7,108,140 B2 | Page 1 of 1 |
| APPLICATION NO. | : 11/138114 | |
| DATED | : September 19, 2006 | |
| INVENTOR(S) | : Frederick William James Whitnall | |

It is certified that error appears in the above-identified patent and that said Letters Patent is hereby corrected as shown below:

Column 4, Line 13, Claim 1:

Delete "for'" and insert -- for --.

Signed and Sealed this

Ninth Day of January, 2007

JON W. DUDAS
*Director of the United States Patent and Trademark Office*